(12) United States Patent
Townend et al.

(10) Patent No.: US 10,531,363 B2
(45) Date of Patent: Jan. 7, 2020

(54) WIRELESS INTERNET ACCESS

(71) Applicant: British Telecommunications Public Limited Company, London (GB)

(72) Inventors: David Townend, London (GB); Francis Scahill, London (GB); Simon Ringland, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/300,156

(22) PCT Filed: Mar. 27, 2015

(86) PCT No.: PCT/GB2015/050930
§ 371 (c)(1),
(2) Date: Sep. 28, 2016

(87) PCT Pub. No.: WO2015/145169
PCT Pub. Date: Oct. 1, 2015

(65) Prior Publication Data
US 2017/0181059 A1    Jun. 22, 2017

(30) Foreign Application Priority Data
Mar. 28, 2014 (EP) .................................. 14250056

(51) Int. Cl.
*H04W 48/08* (2009.01)
*H04W 24/06* (2009.01)
(Continued)

(52) U.S. Cl.
CPC ........... *H04W 48/08* (2013.01); *H04W 24/06* (2013.01); *H04W 84/12* (2013.01); *H04W 88/08* (2013.01)

(58) Field of Classification Search
CPC ............................ H04W 48/08; H04W 24/06
See application file for complete search history.

(56) References Cited

U.S. PATENT DOCUMENTS 8,392,712 B1    3/2013  Wilson
8,576,812 B2   11/2013  Gray et al.
(Continued)

FOREIGN PATENT DOCUMENTS

CN    103259618 A    8/2013
EP      2025106 B9    2/2009
(Continued)

OTHER PUBLICATIONS

Martin Sauter: "Wireless Local Area Network (WLAN)" In: "Communication Systems for the Mobile Information Society", Jul. 14, 2006 (Jul. 14, 2006), John Wiley & Sons, Ltd, Chichester, UK, XP055140319, pp. 217-248.*

(Continued)

*Primary Examiner* — Siming Liu
(74) *Attorney, Agent, or Firm* — Patterson Thuente Pedersen, P.A.

(57) ABSTRACT

A method of controlling wireless Internet access is disclosed. A problem with conventional wireless Internet access is that users of wireless Internet access devices such as smartphones, tablets and laptop computers are often presented with an indication of the availability of an Internet connection, but find when they try to use that connection that it is of a disappointing quality. In some cases, the disappointing quality is caused by a poor radio link between the wireless device and an access point. In order to alleviate the problem in those cases, a method of controlling wireless Internet access is disclosed in which the attachment of a wireless device to a wireless network triggers the access point providing that wireless network to send the wireless device a series of test frames. Only if successful receipt of those test frames is acknowledged by the wireless device, does the access point provide the wireless device with the (Continued)

information it needs in order to establish a connection to the Internet through the access point.

16 Claims, 9 Drawing Sheets

(51) Int. Cl.
*H04W 84/12* (2009.01)
*H04W 88/08* (2009.01)

(56) References Cited

U.S. PATENT DOCUMENTS

| | | | |
|---|---|---|---|
| 2003/0123420 | A1 | 7/2003 | Sherlock |
| 2003/0161341 | A1 | 8/2003 | Wu et al. |
| 2007/0105544 | A1 | 5/2007 | Veres et al. |
| 2008/0253314 | A1 | 10/2008 | Stephenson et al. |
| 2009/0154363 | A1 | 6/2009 | Stephens |
| 2009/0310501 | A1 | 12/2009 | Catovic et al. |
| 2013/0053023 | A1 | 2/2013 | Meredith et al. |
| 2013/0157688 | A1 | 6/2013 | Kateley et al. |
| 2013/0215776 | A1 | 8/2013 | Verpooten |
| 2013/0294263 | A1 | 11/2013 | Haga et al. |
| 2015/0051872 | A1* | 2/2015 | Arora .......... G06F 11/3428 702/186 |
| 2017/0111807 | A1 | 4/2017 | Townend et al. |
| 2017/0111813 | A1 | 4/2017 | Townend et al. |
| 2017/0118091 | A1 | 4/2017 | Townend et al. |

FOREIGN PATENT DOCUMENTS

| | | | | |
|---|---|---|---|---|
| EP | 2477435 | A1 | 7/2012 | |
| EP | 2482490 | A1 | 8/2012 | |
| EP | 2530875 | A1 | 12/2012 | |
| EP | 2 632 071 | A1 | 8/2013 | |
| EP | 2632071 | A1 * | 8/2013 | ............... H04L 1/18 |
| EP | 2680494 | A1 | 1/2014 | |
| EP | 2720409 | A1 | 4/2014 | |
| WO | WO 2008/008990 | A2 | 1/2008 | |

OTHER PUBLICATIONS

PCT International Search Report for PCT/GB2015/050930, dated Jul. 17, 2015, 4 pages.
PCT Written Opinion for PCT/GB2015/050930, dated Jul. 17, 2015, 6 pages.
Martin Sauter: "Wireless Local Area Network (WLAN)" In: "Communication Systems for the Mobile Information Society", Jul. 14, 2006 (Jul. 14, 2006) John Wiley & Sons, Ltd, Chichesterk UK XP055140319, ISBN: 978-0-47-003320-3 pp. 217-248, DOI: 10.1002/9780470033210.ch4.
Application and Filing Receipt for U.S. Appl. No. 15/300,718, filed Sep. 29, 2016. Inventors: Townend et al.
Application and Filing Receipt for U.S. Appl. No. 15/300,679, filed Sep. 29, 2016. Inventors: Townend et al.
Application and Filing Receipt for U.S. Appl. No. 15/300,592, filed Sep. 29, 2016. Inventors: Townend et al.
Broadband Forum Technical Report TR-069 CPE WAN Management Protocol, Issue: 1 Amendment 5, Nov. 2013, 228 pages.
CISCO Systems NetFlow Services Export Version 9, Oct. 2004, https://www.ietf.org/rfc/rfc3954.txt (retrieved Feb. 22, 2018), 29 pages.
International Telecommunications Union; Study Period 2009-2012 Study Group 15—Contribution 807; G.hn Management and Diagnostics Specifications, May 16, 2010; 12 pages.
Kamerman et al, "WaveLAN®-II: A High-Performance Wireless LAN for the Unlicensed Band," in *Bell Labs Technical Journal*, vol. 2, No. 3, pp. 118-133 (16 pages), Summer 1997.
Marrero et al, "An Admission Control and Traffic Regulation Mechanism for Infrastructure WiFi networks." (2007)—available from IAENG International Journal of Computer Science, 35:1, IJCS_35_1_21 http://www.iaeng.org/IJCS/issues_v35/issue_1/IJCS_35_1_21.pdf; 7 pages.
Bianchi et al, "Experimental Assessment of the Backoff Behavior of Commercial IEEE 802.11b Network Cards," *IEEE INFOCOM 2007—26th IEEE International Conference on Computer Communications*, Anchorage, AK, 2007, pp. 1181-1189 (9 pages).
"IEEE Standard for Information technology—Telecommunications and information exchange between systems Local and metropolitan area networks—Specific requirements Part 11: Wireless LAN Medium Access Control (MAC) and Physical Layer (PHY) Specifications", in *IEEE Std 802.11-2012 (Revision of IEEE Std 802.11-2007)*, vol., No., pp. 1-2793, Mar. 29, 2012; pp. 1-72, 382-384, 405-406, 413-424, 824-827, 840, 1016-1018 (97 pages).
Extended European Search Report for EP Application No. 14250056.0; dated Sep. 26, 2014; 8 pages.
Bradner, et al.; "Benchmarking Methodology for Network Interconnect Devices", Network Working Group Request for Comments: 2544, Obsoletes: 1944, Category: Informational; NetScout Systems Mar. 1999; 31 pages.
*802.11 Wireless Networks. The Definitive Guide.* Published by O Reilly. Publication date: Apr. 2002. ISBN 0-596-00183-5. Title page, and Chapter 4 (35 pgs total).
English Translation of Chinese Office Action, Application No. 201580026329.8, dated Apr. 2, 2019, 9 pages.
European Office Action, Application No. 15713804.1, dated Apr. 15, 2019, 3 pages.

* cited by examiner

| Device ID | Frame Size (bytes) | Acknowledged? |
|---|---|---|
| 8C:2D:AA:0D:C5:14 | 14 | Y |
| | 100 | Y |
| | 500 | Y |
| | 1500 | N |
| | 7500 | N |
| 8C:2D:AA:0D:C5:15 | 14 | Y |
| | 100 | Y |
| | 500 | Y |
| | 1500 | Y |
| | 7500 | Y |

Figure 3

| Internet Access Approvals |
|---|
| 8C:2D:AA:0D:C5:15 |
| |
| |
| |
| |

Figure 4

WIRELESS INTERNET ACCESS

RELATED APPLICATIONS

The present application is a National Phase entry of PCT Application No. PCT/GB2015/050930, filed on Mar. 27, 2015, which claims priority to EP Patent Application No. 14250056.0, filed on Mar. 218, 2014, which are hereby fully incorporated herein by reference.

TECHNICAL FIELD

The present disclosure relates to an access point for providing Internet access to wireless devices.

BACKGROUND

Internet access via wireless local area networks is now commonplace. IEEE's 802.11 standard is the most popular wireless local area network standard, and is implemented in a huge number of access points and wireless devices. The operation of a wireless Local Area Network operating in accordance with the IEEE 802.11 standard is discussed in chapter 4 of Martin Sauter's book, "Communication Systems for the Mobile Information Society", published by John Wiley and Sons in 2006.

European Patent Application No. 2 632 071 discloses a method of operating an access point which enables the access point, when starting up, to select one of the available radio channels to provide connectivity between the access point and nearby client devices. The access point tests the quality of each of the channels by first sending a probe response message to a client device at a low power, and if no acknowledgment is received from the client device, sending a probe response at a higher power, and so on, until an acknowledgment is received from the client station, or a probe response is sent at a maximum power. The access point selects the channel on which the least number of probe responses have to be sent as its operating channel. Client devices can then connect to the access point on the selected channel.

In wireless local area networks, access points and wireless devices set up communication between themselves, over a channel selected by the access point, using relatively short management frames. Such management frames can be successfully transmitted even when there is heavy contention for the wireless channel (since they are short they require the channel to be clear for a shorter time), and even when the channel offers a low signal-to-noise ratio (since they are sent at a low data rate).

The present inventors have seen that this behavior negatively impacts on user experience when wireless local area networks are used for Internet access.

SUMMARY

According to a first aspect of the present disclosure, there is provided an access point for use in a wireless local area network, said access point comprising: a radio transceiver; an Internet access port; a radio link tester arranged, once a wireless device has attached to said wireless local area network, to control said radio transceiver to send one or more test frames to said wireless device, and to detect acknowledgments of said test frames received from said wireless device; an Internet access controller arranged in operation to provide Internet access to said wireless device via said Internet access port, subject to the link tester detecting an acknowledgment of said one or more test frames from said wireless device.

By including a link tester in an access point which responds to a wireless device performing a layer 2 attachment to the wireless local area network by sending one or more test frames, and allowing the wireless device to join the Internet via the Internet access port on the condition that those one or more test frames are successfully acknowledged, the wireless device is caused to only offer Internet access to its user if the radio link is reliable enough to support the greater demands placed on the wireless local area network by Internet traffic in comparison to local area network management traffic.

In 802.11 parlance, layer 2 attachment of a wireless device to an access point is referred to as association of the wireless device with the access point.

A benefit of carrying out the link test after the wireless device has attached to a wireless local area network is that the radio link tester and Internet access controller can added to conventional access points without having to alter the electronic hardware and software used by the access point to establish radio links with wireless devices.

In some embodiments, said one or more test frames comprise a plurality of test frames having different characteristics. By using test frames of different characteristics, the test is able to distinguish between different radio channel conditions, and thus provides an indication of the condition of the radio channel between the access point and the wireless device.

According to a second aspect of the present disclosure, there is provided a method of operating an access point to connect a wireless device to the Internet, said method comprising: on a wireless device attaching to the access point, sending one or more test frames to said wireless device, and only providing Internet access to said wireless device on receiving an acknowledgment of the receipt of said one or more test frames from the wireless device.

According to a third aspect of the present disclosure, there is provided an access point for use in a wireless local area network, said access point comprising: a radio transceiver; an Internet access port; a radio link tester arranged to control said radio transceiver to send one or more test frames to said wireless device, and to detect acknowledgments of said test frames received from said wireless device, wherein said test frames are of a range of sizes typical of frames carrying Internet traffic; an Internet access controller arranged in operation to provide Internet access to said wireless device via said Internet access port, subject to the link tester detecting an acknowledgment of said one or more test frames from said wireless device.

By including a link tester in an access point which sends one or more test frames to a wireless device of a range of sizes typical of frames carrying Internet traffic, and only allowing the wireless device to join the Internet via the Internet access port on the condition that those one or more test frames are successfully acknowledged, the wireless device is caused to only offer Internet access to its user if the radio link is reliable enough to support the greater demands placed on the wireless local area network by Internet traffic in comparison to local area network management traffic.

By way of example, one or more test frames might be considered to be typical of Internet traffic if they include frames over 750 bytes in length.

BRIEF DESCRIPTION OF THE DRAWINGS

There now follows, by way of example only, a description of embodiments of the present disclosure. This description is given with reference to the accompanying drawings in which:

FIG. 3 shows a temporary test results table used by a wireless network adapter driver program when running on the access point of FIG. 1.

FIG. 4 shows a temporary Internet access approval list used in limiting the provision of Internet access to wireless devices with a sufficiently good radio link to the access point.

DETAILED DESCRIPTION

Figure 1:
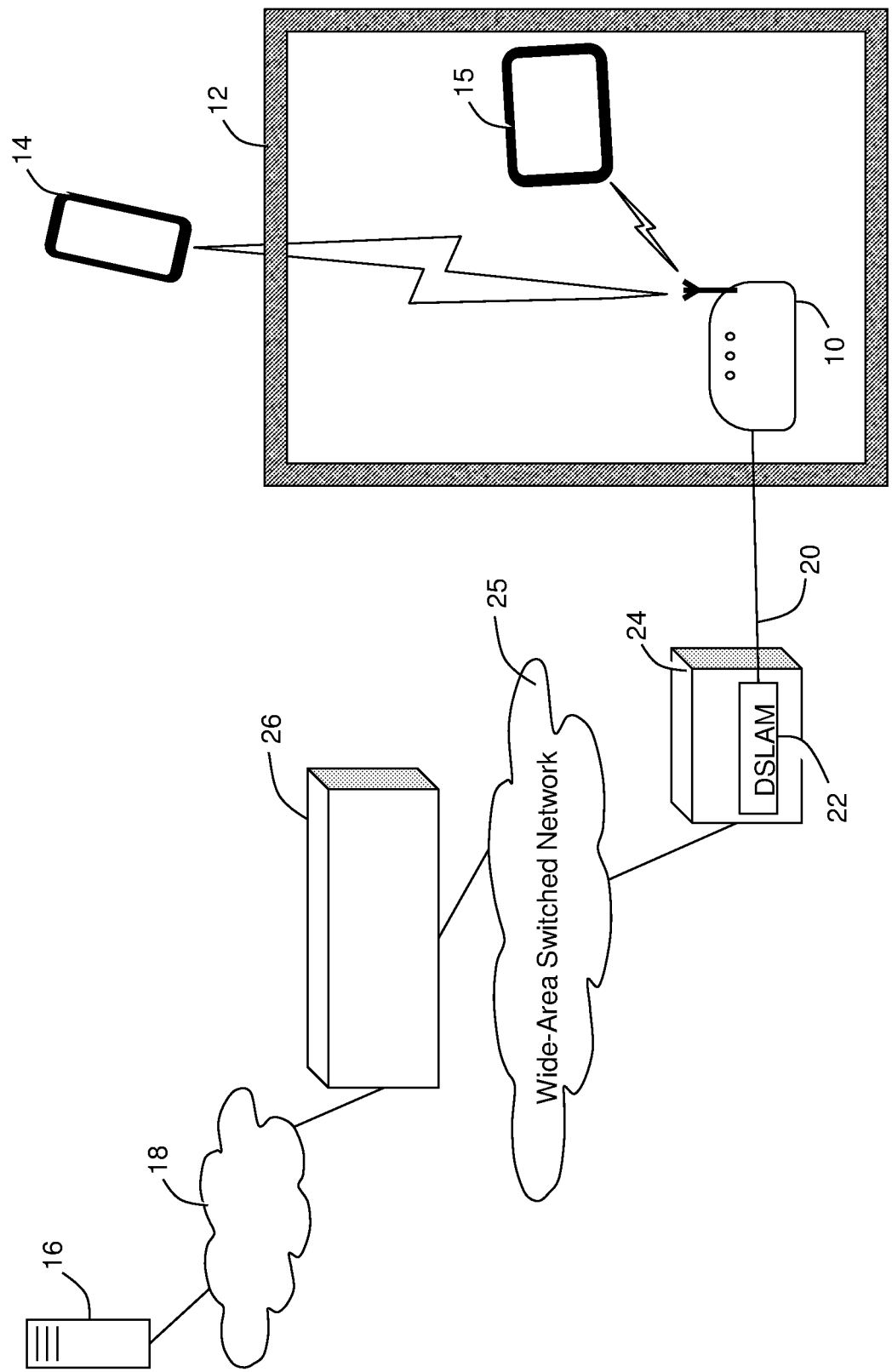
FIG. 1 illustrates a wireless local area network offering Internet access to wireless devices.

FIG. 1 shows a wireless local area network provided by an access point 10 located in a building 12. Should the access point 10 provide each of the wireless devices 14, 15 with Internet configuration information (in particular an IP address), the wireless device 14, 15 is then able to download data from server computers 16 connected to the Internet 18. In order to provide the access point 10 with connectivity to the Internet 16, a pair of copper wires 20 extends from the access point 10 to a Digital Subscriber Line Access Multiplexer (DSLAM) 22 installed in a nearby street cabinet 24. The DSLAM 22 is in turn connected by a wide-area switched network 25 to a Broadband Remote Access Server (BRAS) 26 which is connected to the Internet 18.

Figure 2:
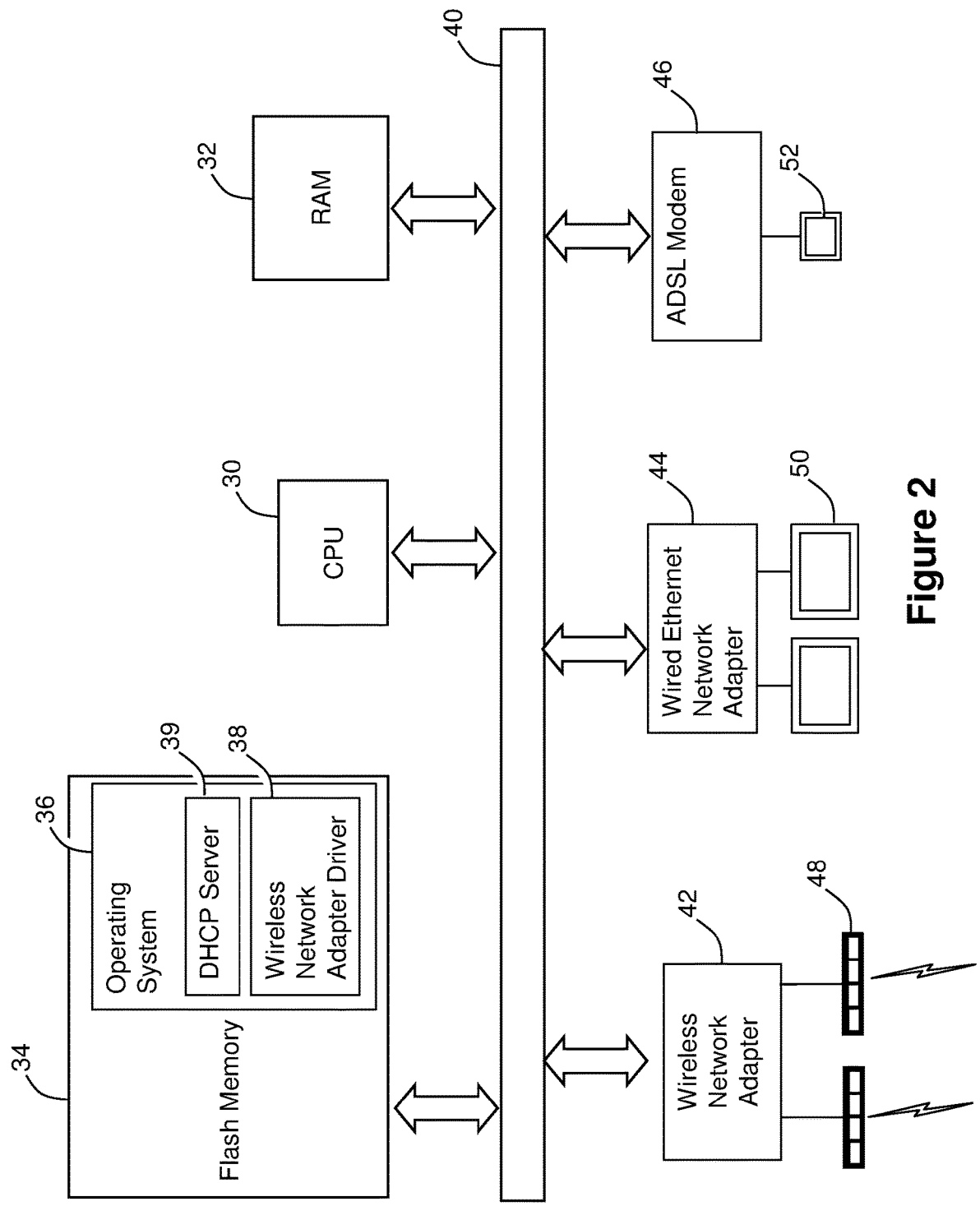
FIG. 2 illustrates the system architecture of the access point providing the wireless local area network of FIG. 1.

The access point 10 (FIG. 2) comprises a central processing unit 30, a volatile memory 32, a flash memory 34 containing an operating system program 36 (in this case a stripped-down Linux kernel) which has a modified wireless network adapter driver program 38, and a modified DHCP server program 39 (DHCP is an abbreviation for the Dynamic Host Configuration Protocol used for distributing network configuration parameters to a host). The processor 30 is able to communicate with each of these memories via a communications bus 40. In use, the volatile memory 32 is used to store a temporary link test result table (FIG. 3) and an Internet access approval list (FIG. 4). The Internet access approval list is populated by the modified wireless network adapter driver 38 and used by the modified DHCP Server 39 as will be explained in more detail below.

Also communicatively coupled to the central processing unit 30 via the communications bus 40 are an 802.11 wireless network adapter 42, a wired Ethernet network adapter 44, and an Asymmetric Digital Subscriber Line (ADSL) modem 46.

As will be understood by those skilled in the art the 802.11 wireless network adapter 42 is electronic hardware which drives one or more radio antennas 48 in order to send radio signals to nearby wireless devices (for example wireless devices 14, 15). When executed by the CPU 30, the wireless network adapter driver program 38 causes the CPU 30 to control the operation of the wireless network adapter 42 by sending commands over the system bus 40.

The wired Ethernet network adapter 44 is electrically connected to two RJ45 jacks 50 which can receive Ethernet cables in order to provide wired connections to computer devices (not shown) in the building 12. The ADSL modem 46 is electrically connected to an RJ11 jack which receives a plug terminating the copper pair 20 leading to the nearby street cabinet 24.

FIG. 3 shows a data structure used to temporarily store the results of a test which may be carried out with a wireless device 14, 15 after that device has performed a layer 2 attachment to the wireless local area network offered by the access point 10. The data structure records an entry 58, 59 for each wireless device which is taking part in (or has recently taken part in) the link test procedure to be described below.

Each device entry includes a wireless device identifier (left-hand column 70), and, for each of a number (in this case five) of test frames, a test record 60-69 incorporating the length of a test frame transmitted by the access point 10 (central column 72), and a Boolean value indicating whether the frame sent in the test has been acknowledged by the wireless device (right-hand column 74). The identifier, in this example, is the wireless device's unique MAC address.

In this embodiment, test frames of different sizes are sent in order to gain an estimate of the channel conditions between the access point 10 and the wireless device 14. The larger test frames require more of the wireless local area network capacity and require a more reliable radio channel in order to be successfully received by the wireless device 14 and acknowledged. The smallest test frames sent are of a similar size to the short frames used in the management messages used by the wireless devices 14, 15 when they join the wireless local area network offered by the access point 10.

FIG. 4 shows an IP access approval list which temporarily stores the identifiers of wireless devices 14, 15 which have a radio channel to the access point which is sufficiently reliable to support typical Internet traffic.

Figure 5:
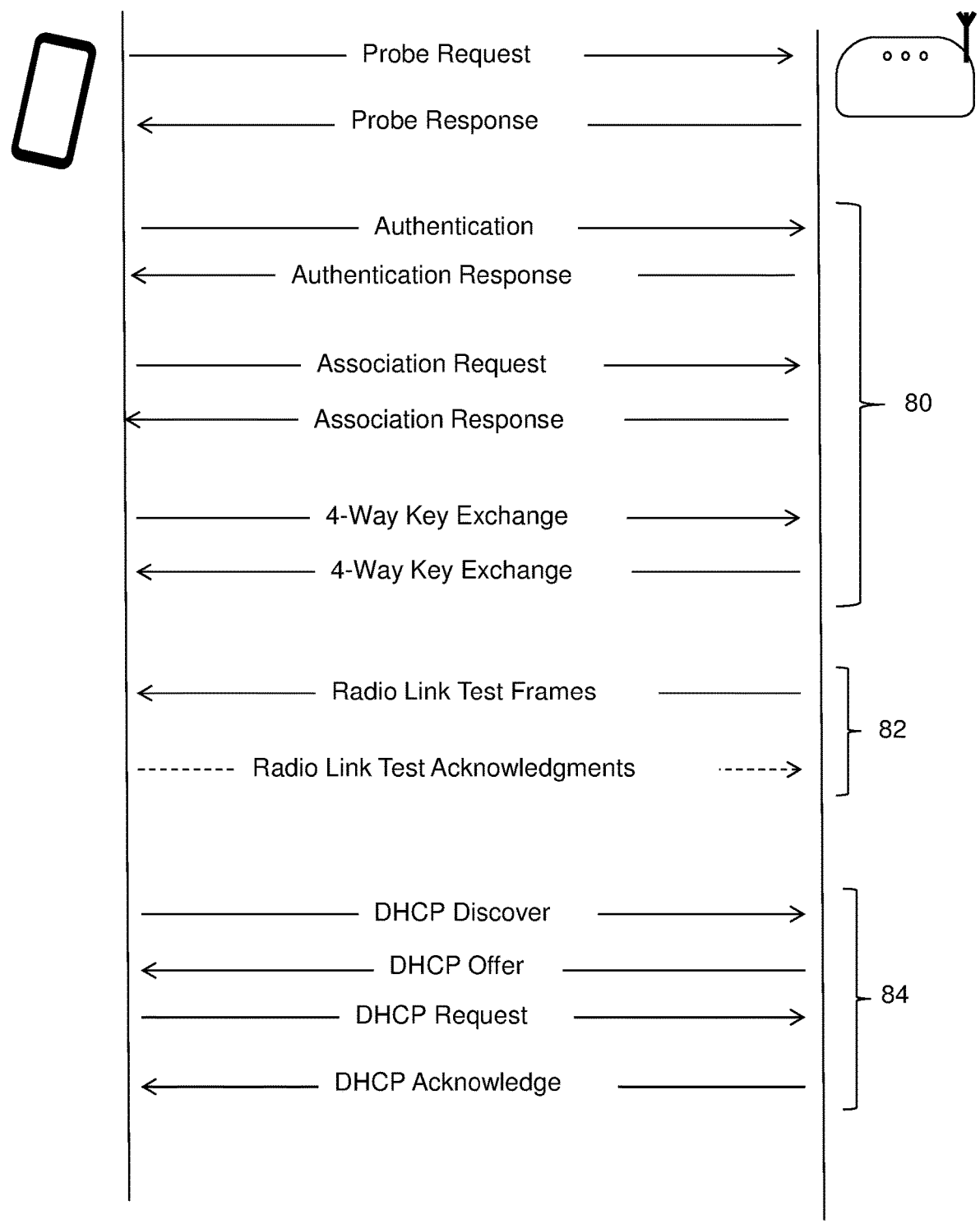
FIG. 5 illustrates the messages exchanged between the wireless device and an access point of FIG. 1 when the wireless device successfully gains Internet access via the access point.

Turning now to FIG. 5, the wireless devices 14, 15 are conventional 802.11 capable devices, and thus occasionally transmit a probe request radio message in accordance with the 802.11 standard in order to discover wireless local area networks to which they might connect. In accordance with the 802.11 standard, the access point 10, on receiving a probe request message responds with a probe response message to alert the wireless device 14, 15 to the presence of the wireless local area network.

If the wireless device 14, 15 is configured to connect automatically to wireless local area networks, or if the user of the device 14, 15 uses the device's user interface to ask to connect to the wireless local area network offered by the access point 10, an exchange 80 of management messages follows which can result in the wireless device 14, 15 joining the wireless local area network. In practice, these management messages 80 are sent at the lowest data rate (or, at least, one of the lower rates) used in the wireless local area network in order to maximize the chance of the messages being successfully received. The effect of using the lowest data rate is that the access point 10 offers a wireless local access network which extends over the largest possible area.

The completion of the exchange of management messages 80 establishes the link between the wireless device 14, 15 and the access point 10.

Figure 6:
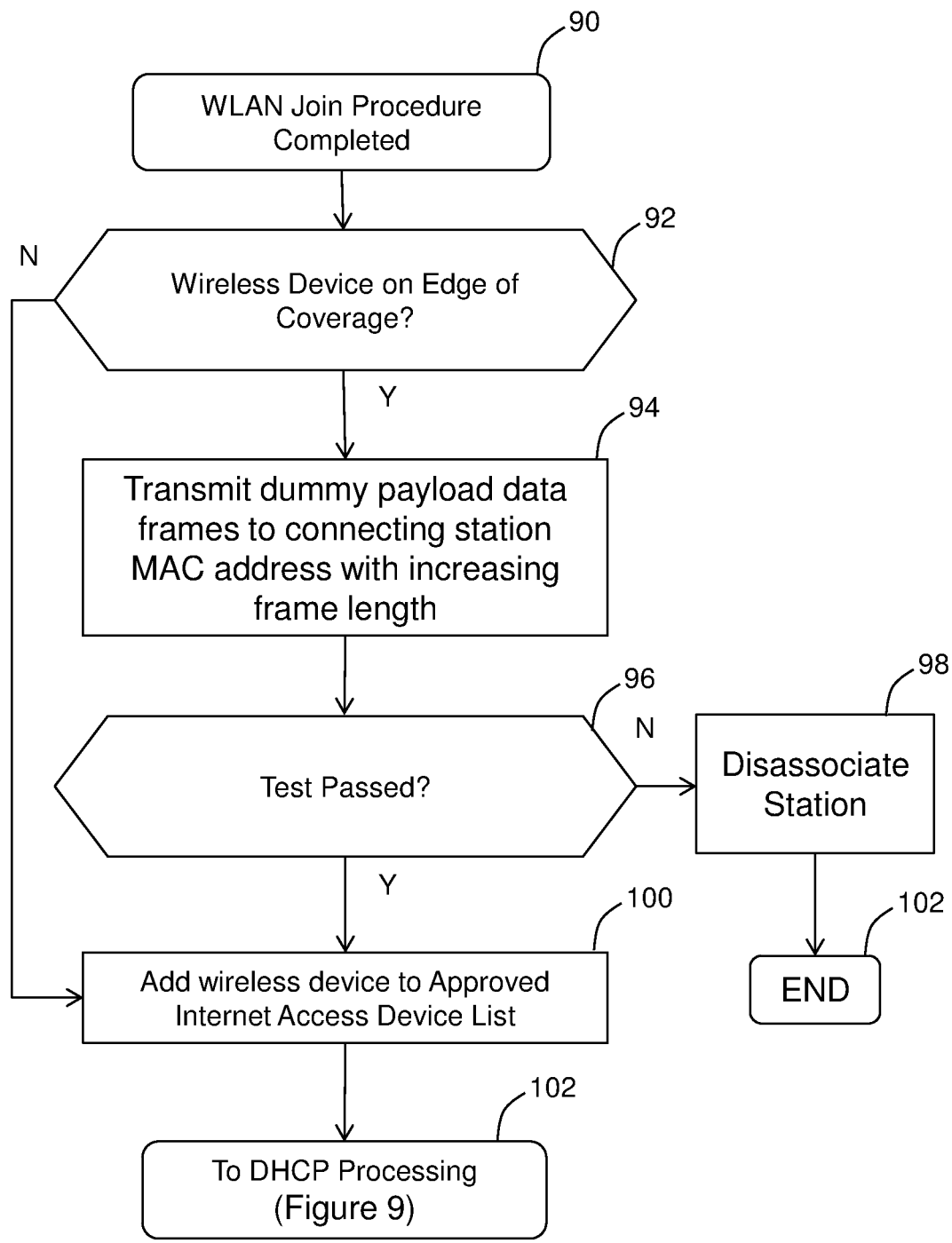
FIG. 6 is a flow-chart showing a radio-link reliability testing procedure carried out under control of the wireless network adapter driver program.
Figure 7:
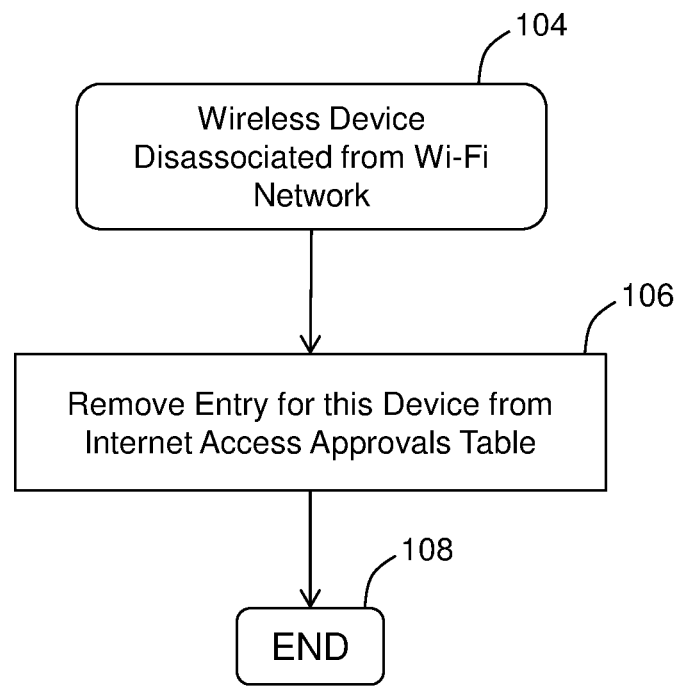
FIG. 7 is a flow-chart showing an Internet access approval deletion routine included within the wireless network adapter driver program.

In contrast to conventional wireless local access networks, the access point 10 follows the exchange of wireless local area network management messages 80 with a series of test messages 82. In the current example, these test messages are sent by the access point 10 at whichever bit-rate the access point would conventionally use to send ordinary traffic frames to the wireless device 14 under these circumstances. The exchange of test messages will be described below with reference to FIGS. 6, 7 and 8.

Since the wireless device 14, 15 is conventional, the wireless device 14, 15 initiates an Internet access configuration message exchange 84 once its link to the wireless local area network is established.

As will be understood by those skilled in the art, the Internet access configuration message exchange is initiated by the wireless device 14, 15 sending either a DHCP Discover message or a DHCP Request message. The wireless device 14, 15 sends a DHCP Request message initially if it works on the assumption that it is re-connecting the wireless local area network it was previously connected to, and therefore requests that it be given the same IP address as it was using previously. If that assumption is proved incorrect, or is not made, then the wireless device 14, 15 sends a DHCP Discover message.

Figure 8:
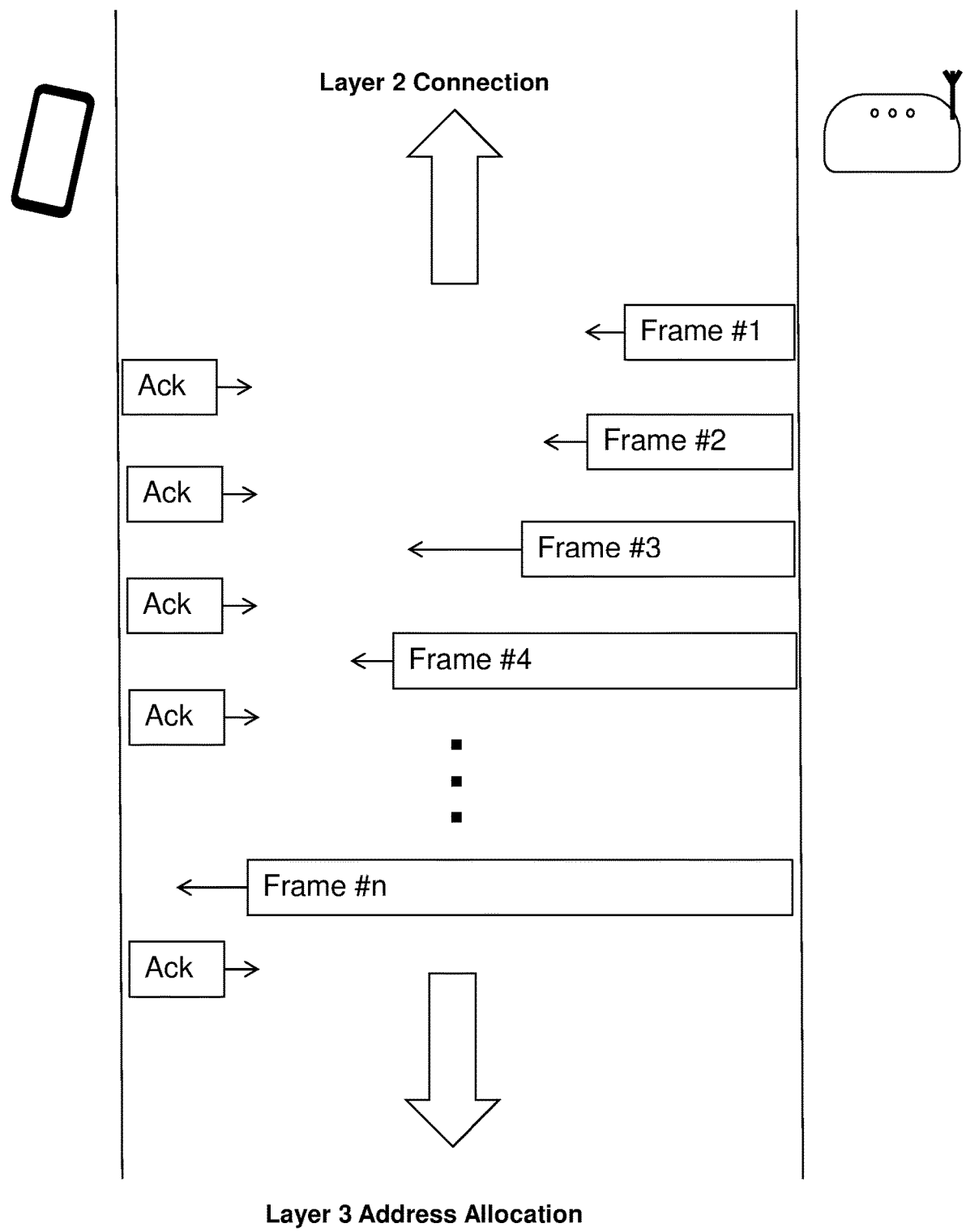
FIG. 8 is an illustration of a sequence of test message exchanges initiated by the access point to test the radio downlink from the access point to the wireless device.

The access point 10 handles the DHCP Discover or DHCP Request message in a way that will be described below with reference to FIG. 8.

The modified operation of the access point 10 under control of the modified wireless network adapter driver program 38 (FIG. 6) begins with the completion 90 of the conventional link establishment phase.

The access point 10 then carries out a signal strength test 92 to find whether the wireless device which has just established a link to the access point 10 is at or close to the edge of the range of the access point 10. In this particular example, the signal strength test 92 finds whether the strength of the signal from the wireless device is less than a threshold of −82 dBm (i.e. the radio signal from the wireless device 14, 15 has a power less than few picowatts).

If the received signal strength is greater than the −82 dBm threshold, then the wireless device's MAC address is added 100 to the approved Internet access device list (FIG. 4). If, on the other hand, the received signal strength is less than the −82 dBm threshold, then the access point 10 sends 94 a series of frames, each of which has a payload filled with dummy data to the wireless device 14, 15 and records whether receipt of those frames is acknowledged. FIG. 8 illustrates the test message exchange. Each test frame is specifically crafted and padded to the required length.

In this particular example, the wireless network adapter driver program 38 causes the access point 10 to transmit, in sequence, five 802.11 unicast 802.11 frames requiring acknowledgment. The lengths of those frames in this particular example are:

First frame—14 bytes
Second frame—100 bytes
Third frame—500 bytes
Fourth frame—1500 bytes
Fifth frame—7500 bytes The modified driver program 38 controls the access point 10 to record, for each of those frames, whether an acknowledgment is received from the wireless device. This information is recorded in the temporary test results table (FIG. 3) stored in the access point's volatile memory 32.

Returning to FIG. 6, the modified driver program 38 then tests 96 whether the reliability of the radio link meets a pre-configured threshold. In the present case, the radio link reliability test 96 finds whether all of the frames were successfully acknowledged. If the radio link reliability test 96 is not passed, then the access point 10 tears down the link between the access point 10 and the wireless device 14, 15 by disassociating 98 the wireless device 14, 15 in accordance with the 802.11 standard. The radio-link reliability testing procedure then ends 102.

If, on the other hand, the radio link reliability test 96 is passed, then the MAC address of the wireless device is added 100 to the approved Internet access device list. The radio-link reliability testing procedure then ends 102.

By way of an example use case, should the test results be as shown in FIG. 3, and the test conditions require that all five frames are successfully acknowledged, then the wireless device 14 outside the building 12 (that device's MAC address being 8C:2D:AA:0D:C5:14) would fail the test. The access point 10 would then disassociate that wireless device. By contrast, the wireless device 15 within the building (the MAC address of that device being 8C:2D:AA:0D:C5:15) would pass the test, and would be entered into the Internet access approval list as is shown in FIG. 4.

In order to keep the Internet access approval list (FIG. 4) reasonably current, each time a wireless device 14, 15 disassociates or detaches from the access point 10, an Internet access approval deletion routine (FIG. 7) is run in which the access point 10 reacts to the disassociation 104 by deleting 106 any entry relating to the disassociated wireless device from the Internet access approval list (FIG. 4).

Figure 9:
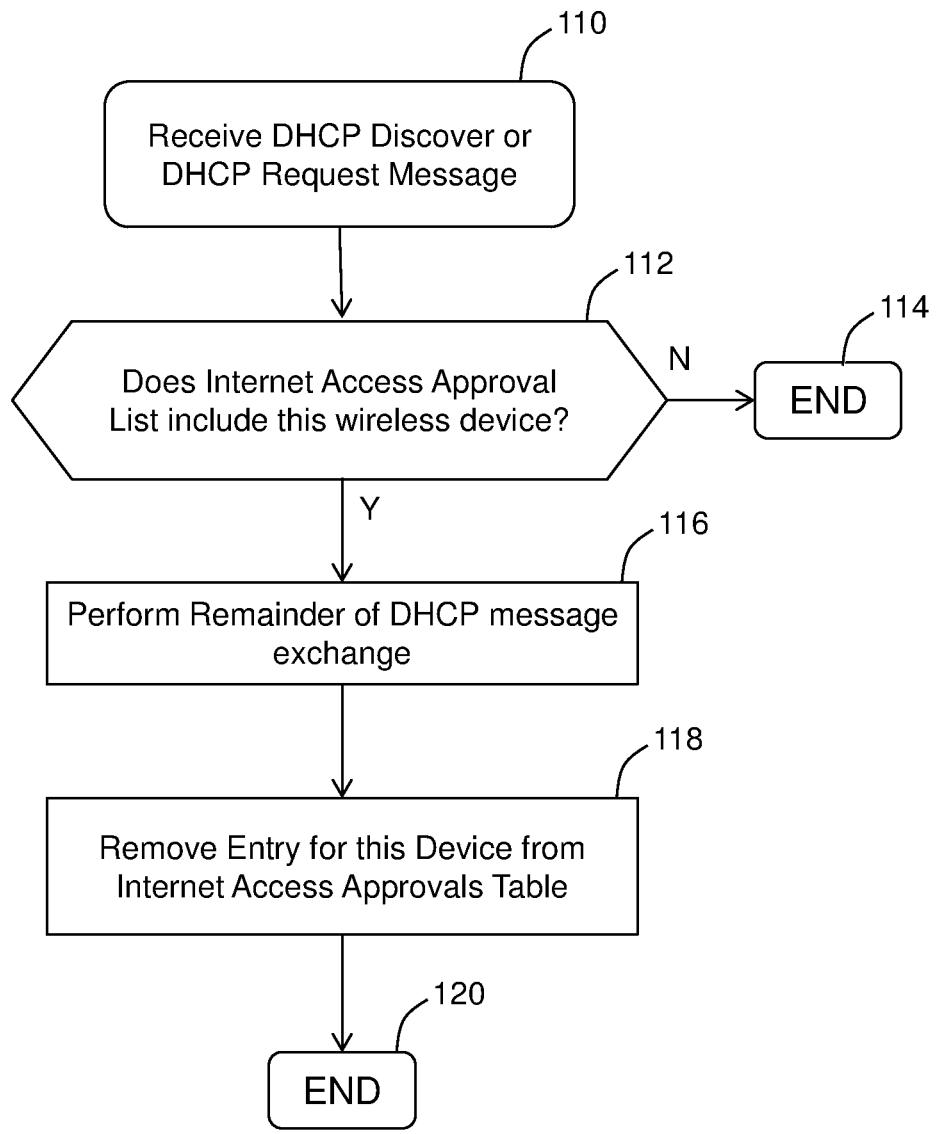
FIG. 9 is a flow-chart showing the operation of a modified DCHP server program.

The inbound DCHP message-handling procedure performed by the access point 10 under the control of the modified DHCP server program 39 is shown in FIG. 9. On receiving 110 a DHCP Discover or DHCP Request message, the access point 10 checks 112 whether the MAC address of the sender of the 802.11 frame is to be found in the approved Internet access devices table (FIG. 4) stored in the access point's volatile memory 32. If the MAC address of the sender is not present in that table, then the DHCP message-handling procedure ends 114 (in other words, if the sender of the frame has not demonstrated a sufficiently reliable radio link to the access point 10 during the radio-link reliability test procedure (FIG. 6), then DHCP messages from the wireless device are ignored).

However, if that table does include the MAC address of the wireless device which sent the DHCP message, then the remainder of the DHCP message exchange is handled 116 in a conventional manner, providing the wireless device 14, 15 with the information it needs in order to access the Internet via the access point 10. The modified DHCP message handling procedure then ends 120.

It will be seen how the above embodiment prevents a wireless device which has an unreliable radio link to an access point from being able to use that access point to access the Internet. Because any procedure run by the wireless device, for manually or automatically joining the Internet is unsuccessful, the user of the wireless device is spared the disappointment of seeing an Internet connectivity indication on their device, only to find that they are, in fact, unable to usefully interact with servers on the Internet. Furthermore, by basing the radio link assessment on a range of frame sizes, an estimate of the radio channel conditions is obtained.

In contrast to the prior-art, in the present embodiment, the access point sends dummy payload data frames with increasing frame length. The frames are more representative of typical Internet traffic than the relatively short management frames used in the prior-art.

Many variations may be made to the above-described embodiment. These include, but are by no means limited to:

i) whilst a series of test frames were sent in the above embodiment in which each test frame was larger than the previous frame, the radio-link reliability test might send only a single frame of a length substantially greater than a management frame. The order in which the frames are sent might be varied (i.e. there need not be a monotonic increase in the length of the test frames sent in the series). Indeed, the test frames could be a plurality of frames, each having the same length and each being of a length substantially greater than a management frame. In other embodiments, the longer frames might be sent first, and the test failed if any frame is not acknowledged.

ii) whilst in the above embodiment the sending of a series of test frames was bypassed if the signal strength was found to exceed a −82 dBm threshold, the signal strength test might be omitted so that all wireless devices must engage in acknowledging one or more test frames before being enabled to join the Internet. The actual value of the signal strength threshold could vary from the above value.

iii) in the above embodiment, only if every one of the series of test frames were acknowledged, was the wireless device allowed to join the Internet. In other embodiments, acknowledgment of a subset of the test frames might be sufficient to pass the radio reliability link test. In some cases, the signal strength test and radio link reliability test might be made dependent on one another—so, for example, failing the signal strength test might not be determinative of whether Internet access is denied, but instead the number of test frames required to be acknowledged to pass the radio link reliability test might be greater for wireless devices which fail the signal strength test. Similarly, wireless devices which fail the signal strength test might be sent a greater number of test frames or test frames of a greater length or both.

iv) in the above embodiment, the access point determined the bit-rate at which the test frames were to be sent in the same way it determines the bit-rate for sending normal Internet downlink traffic. However, the bit-rate could be varied in order to vary the difficulty of the radio-link reliability test—in the same way that longer test frames require a more reliable radio link, test frames sent at a higher bit-rate require a more reliable radio link.

v) in the above embodiment, the test frames were padded data frames. In alternative embodiments, the test frames might instead be 802.11 action frames.

vi) whilst the above embodiment relates to the popular 802.11 wireless networking standard, in other embodiments, wireless Internet access via different radio technologies might be controlled in a similar way. Examples of other wireless Internet access technologies include Bluetooth (registered trade mark).

vii) In practice, if, as in the above embodiment, the access point starts with small packets (like those used to establish the layer 2 WiFi connection) these might be acknowledged, but larger frames similar to those used for landing page traffic might not get through to the wireless device. In an alternative embodiment, the access point might store a threshold value that could be configured to set the difficulty of the radio link reliability test. The value might for be example configured to match the above embodiment such that all test frames must be acknowledged. Alternatively, the configurable parameter could be set to a less demanding value—for example it might be set to a value such that acknowledgment of test frames up to 750 bytes is required from a wireless device before the access point provides Internet access to that device;

viii) in the above embodiment, the access point does not retransmit frames for which no immediate acknowledgment is received. In alternative embodiments, the access point might try to retransmit an unacknowledged frame one or more times, and the test record might include a record of the number of retransmissions required before receipt is successfully acknowledged. In that case, whether the radio link passes the test might depend upon the lengths of the frames sent, whether the frames are acknowledged within a threshold number of attempts, and for those frames which are acknowledged, the number of transmissions and retransmissions required before receipt of the test frame is acknowledged;

ix) in the above embodiment, the test conditions did not include the bit-rate at which the access point sends the test frame. In alternative embodiments, the bit-rate at which the frames (and possibly retransmissions of the frames) are sent is included in each test record. In that case, whether the radio link passes the test might depend upon the lengths of the frames sent, and the bit-rate at which the frames and any retransmissions of the frames were sent;

x) in the above embodiment, one test frame of each size was sent. In alternative embodiments, a plurality of test frames of each size are sent, and whether the radio link test is passed depends upon the number, fraction or percentage of the frames of each size which are successfully acknowledged.

xi) in the above embodiment, the results of the radio link testing process were communicated to the Internet access control process using an Internet access approval list stored in the access point's temporary memory. In other embodiments, other forms of interprocess communication might be used instead. In some embodiments, a list of devices which have passed the radio link test might be stored at a memory, separate from, but nevertheless accessible to, the access point.

xii) in the above embodiment, the access point forced the disassociation of a wireless device which failed the radio link test. In other embodiments, the access point could, for a predetermined period of time, block subsequent reattempts from the same wireless device to associate with the access point.

In summary of the above disclosure, a method of controlling wireless Internet access is disclosed. A problem with conventional wireless Internet access is that users of wireless Internet access devices such as smartphones, tablets and laptop computers are often presented with an indication of the availability of an Internet connection, but find when they try to use that connection that it is of a disappointing quality. In some cases, the disappointing quality is caused by a poor radio link between the wireless device and an access point. In order to alleviate the problem in those cases, a method of controlling wireless Internet access is disclosed in which the attachment of a wireless device to a wireless network triggers the access point providing that wireless network to send the wireless device a series of test frames. Only if successful receipt of those test frames is acknowledged by the wireless device, does the access point provide the wireless device with the information it needs in order to establish a connection to the Internet through the access point.

The invention claimed is:

1. An access point for use in a wireless local area network (WLAN), the access point comprising:
   a radio transceiver;

an Internet access port; and an Internet access controller;

the access point being arranged in operation to exchange management frames with a wireless device in order to attach the wireless device to the WLAN, the access point further comprising a radio link tester arranged to perform a radio link test in response to the wireless device attaching to the WLAN, the radio link test comprising:

controlling the radio transceiver to send a test frame requiring acknowledgement to the wireless device, the test frame being of a length substantially greater than each of the management frames, and determining whether the radio link test is passed or failed, wherein the radio link test is only passed if an acknowledgement of the test frame is received by the radio transceiver from the wireless device; and wherein the Internet access controller is arranged in operation to, when the radio link tester determines that the radio link test is passed, allow the wireless device to join the Internet via the Internet access port by controlling the radio transceiver to perform a message exchange with the wireless device to provide the wireless device with an Internet address.

2. The access point according to claim 1, wherein the radio link test comprises the radio link tester controlling the radio transceiver to send a plurality of test frames having different characteristics.

3. The access point according to claim 2, wherein the plurality of test frames are of different sizes.

4. The access point according to claim 2, wherein at least one of the plurality of test frames carries dummy payload data.

5. The access point according to claim 4, wherein the test frames of the plurality of test frames carry different amounts of dummy payload data.

6. The access point according to claim 1, further comprising a store arranged in operation to store one or more configurable thresholds used to configure a stringency of the radio link test.

7. The access point according to claim 1, further arranged in operation to terminate attachment of the wireless device to the access point responsive to no acknowledgment of the test frame being received.

8. The access point according to claim 1, wherein the radio link tester is arranged to control the radio transceiver to send the test frames to the wireless device after the wireless device has performed layer 2 attachment to the access point.

9. The access point according to claim 1, wherein the test frame is over 750 bytes in length.

10. The access point according to claim 1, wherein:

the access point is further arranged in operation to respond to the wireless device attaching to the WLAN, the response including receiving an Internet access configuration initiation message from the wireless device; and the Internet access controller is further arranged in operation to, when the radio link tester determines that the radio link test is failed, not allow the wireless device to join the Internet via the Internet access port by ignoring the Internet access configuration initiation message.

11. A method of operating an access point in a wireless local area network (WLAN) to connect a wireless device to the Internet, the method comprising:

exchanging management frames with the wireless device to attach the wireless device to WLAN;

in response to the wireless device attaching to the WLAN, performing a radio link test comprising:

sending a test frame of a length substantially greater than each of the management frames to the wireless device, and determining whether the radio link test is passed or failed, wherein the radio link test is only passed if an acknowledgment of the test frame is received by the access point from the wireless device; and when the radio link tester determines that the ratio link test is passed, allowing the wireless device to join the Internet via an Internet access port by performing a message exchange with the wireless device to provide the wireless device with an Internet address.

12. A non-transitory computer-readable storage medium storing a program executable by a processor in an access point to cause the access point to perform the method of claim 11.

13. The method according to claim 11, wherein the test frames are sent after the wireless device has performed layer 2 attachment to the access point.

14. The method according to claim 11, wherein the test frame is over 750 bytes in length.

15. The method according to claim 11, further comprising:

responsive to the attachment of the wireless device to the WLAN, receiving an Internet access configuration initiation message from the wireless device; and when the radio link tester determines that the radio link test is failed, not allowing the wireless device to join the internet via the Internet access port by ignoring the Internet access configuration initiation message.

16. An access point for use in a wireless local area network, the access point comprising:

a radio transceiver;

an Internet access port;

an Internet access controller;

a radio link tester arranged to control the radio transceiver to send one or more test frames over 750 bytes in length to a wireless device, and to detect acknowledgments of said test frames received from the wireless device;

an approved device list generator arranged in operation to generate a list of wireless devices which have successfully passed the radio link test acknowledged a requisite number of said test frames;

an Internet access controller arranged in operation to provide Internet access to a candidate wireless device only if said candidate wireless device is included in the list.

* * * * *